United States Patent
Kronhamn

(10) Patent No.: US 6,580,387 B2
(45) Date of Patent: Jun. 17, 2003

(54) FINDING THE RANGE TO A MOVING OBJECT BY MEANS OF AN ANGLE-ONLY SENSOR

(75) Inventor: Thomas Kronhamn, Hälsö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/021,432

(22) Filed: Dec. 19, 2001

(65) Prior Publication Data

US 2002/0113729 A1 Aug. 22, 2002

(30) Foreign Application Priority Data

Dec. 21, 2000 (SE) .............................................. 0004752

(51) Int. Cl.[7] .......................... G01S 13/08; G01S 5/04; G01S 11/04
(52) U.S. Cl. ....................... 342/146; 342/118; 342/133; 342/417
(58) Field of Search .......................... 342/95, 118, 126, 342/133, 146, 417

(56) References Cited

U.S. PATENT DOCUMENTS

| 5,479,360 A | 12/1995 | Seif et al. | |
| 5,504,489 A | 4/1996 | Kronhamn | |
| 5,739,789 A | * 4/1998 | Kronhamn | 342/417 |
| 5,877,722 A | * 3/1999 | Shams | 342/147 |
| 6,064,942 A | * 5/2000 | Johnson et al. | 342/118 |

OTHER PUBLICATIONS

"Bearings–Only Target Motion Analysis Based on a Multi-hypothesis Kalman Filter and Adaptive Ownship Motion Control", Kronhamn, IEE Proc.–Radar, Sonar Navig., vol. 145, No. 4, Aug. 1998, pp. 247–252.

"The Interacting Multiple Model Algorithms for Systems with Markovian Switching Coefficients", IEEE Transactions On Automatic Control, vol. 33, No. 8, Aug. 1988, pp. 780–783.

* cited by examiner

Primary Examiner—Ian J. Lobo
(74) Attorney, Agent, or Firm—Nixon & Vanderhye P.C.

(57) ABSTRACT

A method for calculating the range to a moving object by way of a sensor that determines the angle of the object. The sensor and the object move relative to one another, and after one measurement the procedure is as follows: on the assumption that the target maintains a constant velocity, a number of possible target ranges are calculated, as well as areas of uncertainty associated with these ranges, so-called "straight trajectory models" (410, 411, 412), on the assumption that the target accelerates, a number of possible target ranges are calculated, as well as areas of uncertainty associated with these ranges, so-called "maneuvering models" (420, 421, 422), a number of the straight trajectory models (410, 411, 412) having a maneuvering model assigned to them.

4 Claims, 5 Drawing Sheets

FINDING THE RANGE TO A MOVING OBJECT BY MEANS OF AN ANGLE-ONLY SENSOR

TECHNICAL FIELD

The invention relates to a method for determining the range to a moving object by means of a sensor capable of measuring the bearing or angle to the object. The invention affords greater accuracy in such calculations than has hitherto been possible.

BACKGROUND ART

Determining the range of an object by means of an instrument or a sensor that is only capable of providing information on the bearing or angle to the object is a longstanding problem, an example of the application of which is the so-called triangulation of radio transmitters. If the range is to be determined using only a single measuring instrument or sensor, the sensor must have a movement in relation to the target over a number of successive measurements. In order to obtain particularly reliable measurement data, it may be advantageous if, between the measurements, the sensor platform is made to move along a path that optimizes the measurements.

Conventional methods of determining the range to a moving object by means of a single angle-only sensor have often assumed that the target moves without acceleration between the measurements, the term acceleration being used in the sense of "variation of the speed vector", in other words it has been assumed that the target does not alter either its course or its speed between the measurements. These methods work well if the assumption regarding the absence of acceleration on the part of the object is correct, but unfortunately this is often not the case. Such a method is described in [1].

One known method of achieving good accuracy in determining the range to a moving, accelerating target is to use so-called Interacting Multiple Models (IMM), which are described in and elsewhere. According to this method, two models for the target are assumed, on the one hand a so-called straight trajectory model, which means that the target is assumed not to accelerate, and on the other a model according to which the target is assumed to accelerate only between the measurements, a so-called maneuvering model. In calculations according to IMM, the maneuvering model is allowed to influence the straight trajectory model, and conversely the straight trajectory model is allowed to influence the maneuvering model in a predefined manner in accordance with the probabilities for each model. In applying the IMM method of determining the range of maneuvering targets on the basis of measurements by a single directional sensor, a conflict arises between the range finding and any tracking of a maneuvering target. This conflict means that the existence of maneuvering models leads to poor accuracy of the range calculations when the target is not maneuvering.

DISCLOSURE OF INVENTION

There is consequently a need for a method which, by means of an angle-only sensor, is capable of providing more reliable range calculations to a moving target than methods hitherto known.

The present invention achieves this through a method for calculating the range of an object by means of a sensor capable of determining the angle to the object, where the sensor and the object have a movement relative to one another, comprising the following after a measurement:

on the assumption that the target maintains a constant velocity, a number of possible target ranges are calculated. For each such possible range an area of uncertainty is calculated, within which the target may be located, a so-called "straight trajectory model", on the assumption that the target accelerates, a number of possible target ranges are calculated. For each such possible range an area of uncertainty is also calculated, within which the target may be located, a so-called "manoeuvring model", and a number of the straight trajectory models have a manoeuvring model assigned to them.

In calculating the target range in the straight trajectory models that have associated manoeuvring models, data from the respective manoeuvring model is incorporated to a predetermined extent if the probability that the target manoeuvres exceeds a predetermined limit, which can also be applied when calculating other data for the target.

The range of the target from the sensor is calculated as a weighted average of a number of ranges of the straight trajectory models, where the weighting being based on the probability of each straight trajectory model, which is a procedure that can also be used when calculating other data for the target. In calculating the possibility of the target maneuvering, use may also be made of prior knowledge of the type of target, geography etc.

BRIEF DESCRIPTION OF DRAWINGS

The invention will be explained in more detail below with the aid of exemplary embodiments, and with reference to the attached drawings, in which.

MODE(S) FOR CARRYING OUT THE INVENTION

Figure 1:
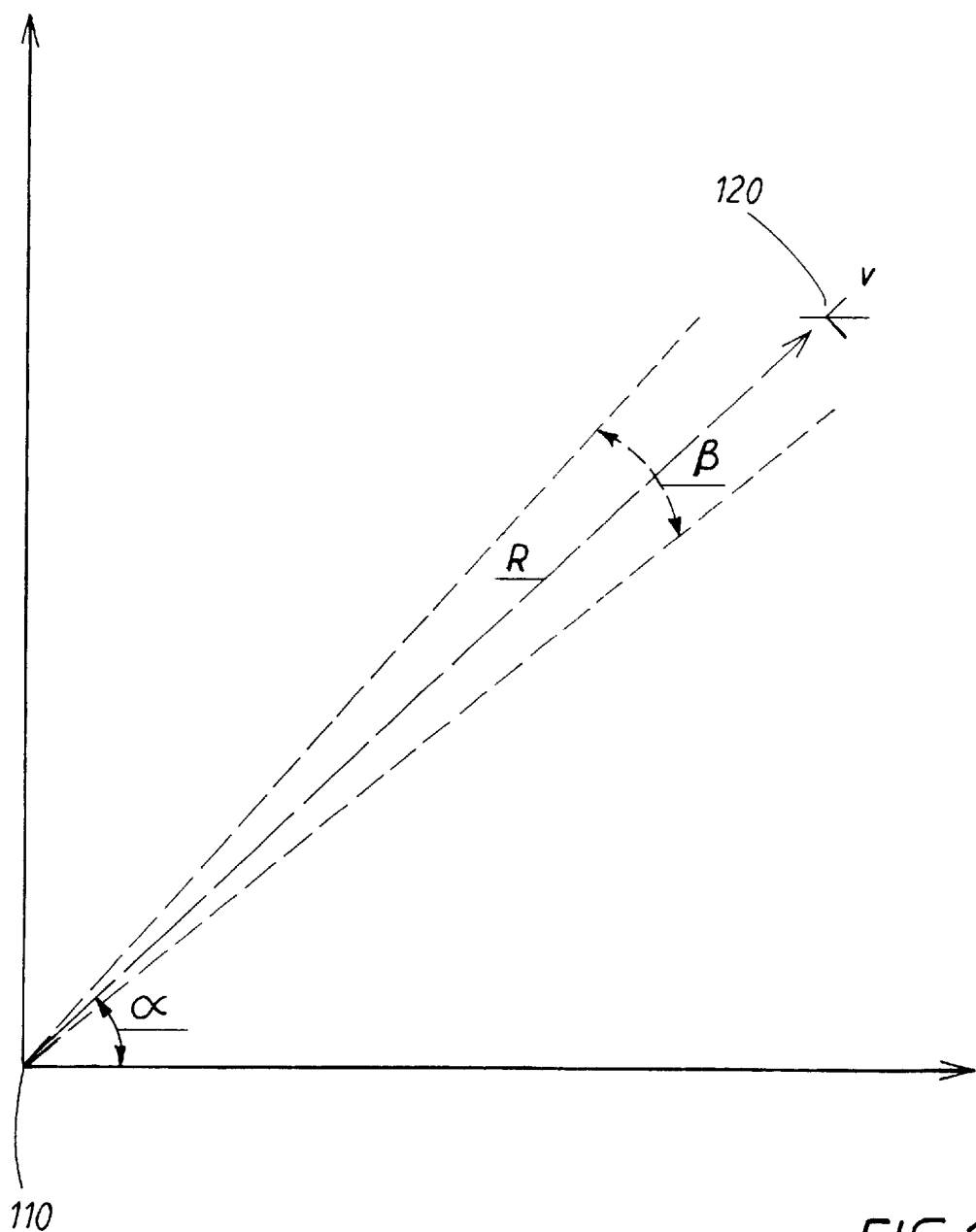
FIG. 1 shows the principle of a sensor, which is used in a method according to the invention.

FIG. 1 shows the principle of a sensor to which the invention can be applied. A sensor 110, positioned in a rectangular co-ordinate system, is capable of measuring the angle α, but not the range R to a moving object 120. Data from the angle measurements have a specific uncertainty, which is shown by a cone with the aperture angle β around the measured angle α. An object of the invention is to enable reliable calculation of the range R between the target and the sensor.

Figure 2:
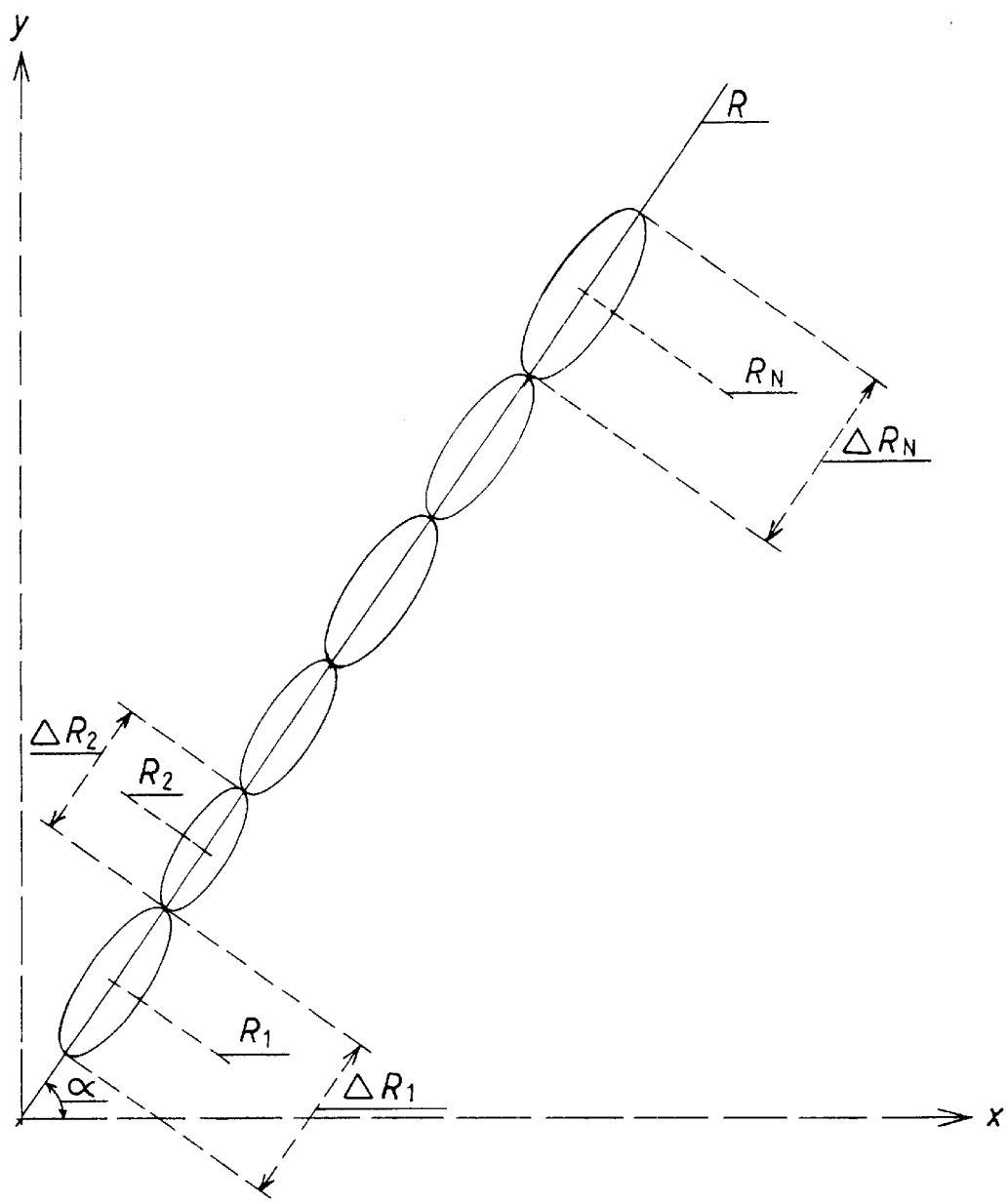
FIG. 2 shows a sub-division into straight trajectory models according to the invention.

FIG. 2 shows one of the underlying principles of the invention: On the range axis R along the angle a to the target, after one measurement a number of possible target positions $R_1, R_2 \ldots R_N$ are calculated for the target on the assumption that the target maintains a constant velocity. For each target position $R_1, R_2 \ldots R_N$ an associated area of uncertainty $\Delta R_n$ is also calculated, which is termed a "straight trajectory model", since it is based on the assumption that the target has a constant velocity, where the velocity is a vector quantity having magnitude (speed) and direction. If the vector is modified, the direction and/or speed of the target is consequently modified. That is to say, a target velocity can also be calculated for each straight trajectory model.

The areas of uncertainty of the straight trajectory models extend both in a longitudinal and in a transverse direction, that is to say, along and across the axis R. The areas of uncertainty are suitably formed as ellipses, where the centre of the ellipsis number n corresponds to the target range $R_N$. The ellipses describe the locus for the deviations from the origin having a certain probability. The ellipse is usually chosen to correspond to 1 standard deviation (1σ) for the magnitude of the deviation, or any multiple thereof.

The ellipses, the models, are suitably, but not necessarily, initially of different size, and dimensioned so that the ratio $\Delta R_n/R_n$ is constant for all ellipses, where $\Delta R_n$ is the major axis of the ellipse, and $R_n$ is the distance from the centre of the ellipse to the origin. The minor axis of each ellipse may consist of the measuring uncertainty of the sensor, which is a known constant, and the centre of each ellipse is the initially assumed target range for the model.

The number of ellipses or models used is initially obtained after the first measurement as shown in FIG. 1, by fixing an outer range $R_{max}$, beyond which the target is not thought to be located, and an inner range $R_{min}$, within which the target is not thought to be located. The distance $R_{max}$, $R_{min}$ is divided into a number of models as described above, the number of models being a balance between calculating capacity and accuracy. A suitable value for the number of ellipses may be 5–10, but even 3–5 ellipses have proved to work well. It is to these initial models and their centre points that the calculations according to the invention are applied.

According to the invention, in one measurement so-called "maneuvering models" are also calculated, which consist of a number of possible positions for the target, based on the assumption that the target accelerates, that is to say that the target varies the velocity vector, which therefore implies a change in the speed and/or course of the target. For these positions also, the areas of uncertainty are calculated, one for each position. The maneuvering models appropriately have the same form as those of the straight trajectory models, so that in a preferred embodiment the maneuvering models are therefore ellipses, the major axes of which coincide with the axis R of the target, and the minor axes of which intersect the axis R.

Figure 3:
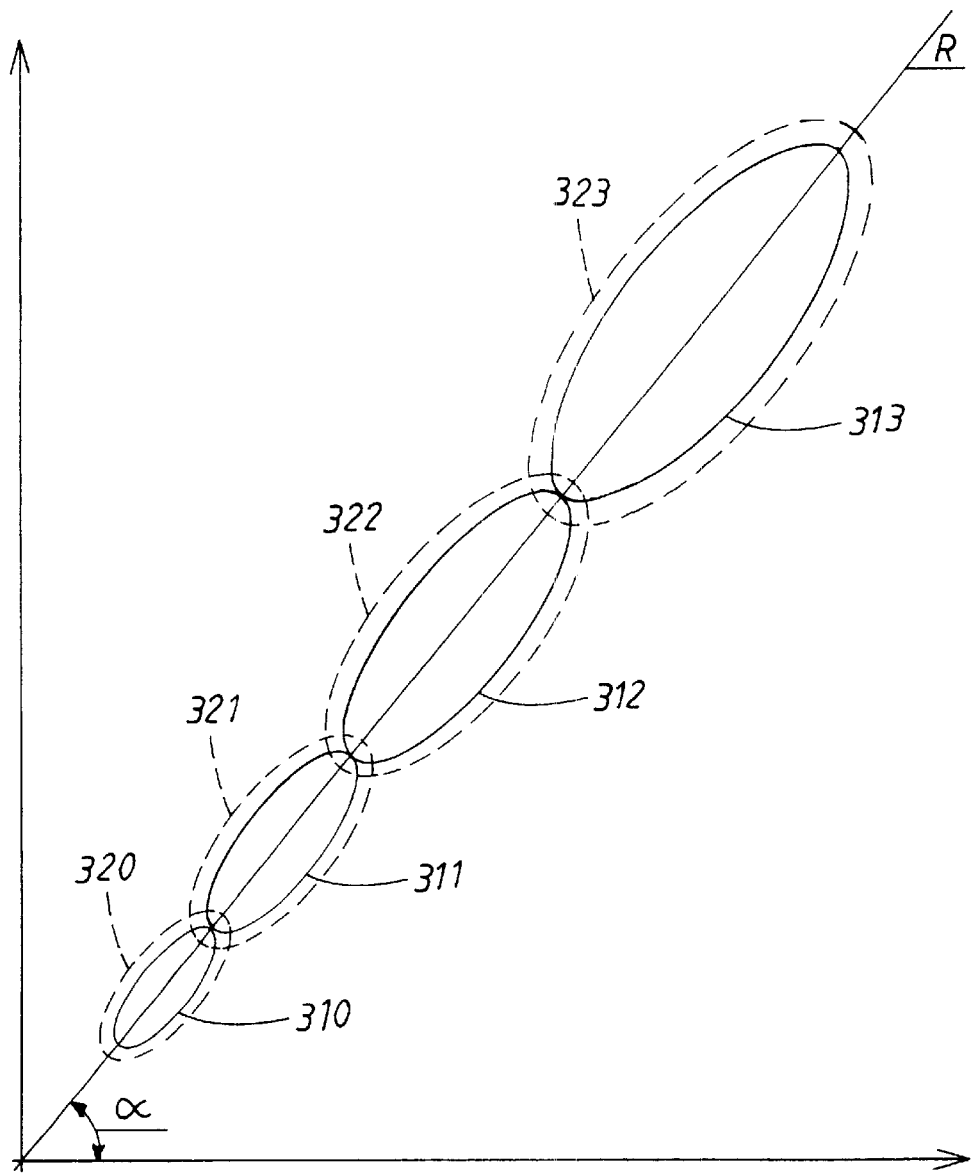
FIG. 3 shows the sub-division into straight trajectory models and associated manoeuvring models according to the invention.

A number of the straight trajectory models 310, 311, 312, 313 have maneuvering models, 320, 321, 322, 323 assigned to them, as is shown in FIG. 3, in which the straight trajectory models 310–313 are shown with sold lines, and corresponding maneuvering models 320–323 are shown with dashed lines. Each straight trajectory model appropriately but not necessarily has a corresponding maneuvering model and vice versa.

According to the invention, each hypothesis for a target, that is to say each straight trajectory and manoeuvring model for a target, is defined by the following three components:

a state vector, X
a co-variance matrix, P
a probability $\mu$, for the hypothesis In a preferred embodiment, the state vector X for a model may be defined in a two-dimensional Cartesian system of co-ordinates according to the following:

$$X = \begin{bmatrix} x \\ y \\ x' \\ y' \end{bmatrix}$$

where x and y are calculated co-ordinates of the target in each direction, and x' and y' are calculated velocity components of the target in each direction.

The covariance matrix P for a model is defined as follows:

$$P = \begin{bmatrix} \sigma^2_{xx} & \sigma^2_{xy} & \sigma^2_{xx'} & \sigma^2_{xy'} \\ \sigma^2_{yx} & \sigma^2_{yy} & \sigma^2_{yx'} & \sigma^2_{yy'} \\ \sigma^2_{x'x} & \sigma^2_{x'y} & \sigma^2_{x'x'} & \sigma^2_{x'y'} \\ \sigma^2_{y'x} & \sigma^2_{y'y} & \sigma^2_{y'x'} & \sigma^2_{y'y'} \end{bmatrix}$$

The diagonal elements of the matrix represent the variations for the uncertainties in each element of the state vector. The non-diagonal elements are the co-variances between respective elements of the state vector.

The probability $\mu$ for a model is, as the word suggests, a calculation of what the probability is that the true state of the target, including the range, is that indicated by the model.

Figure 4:
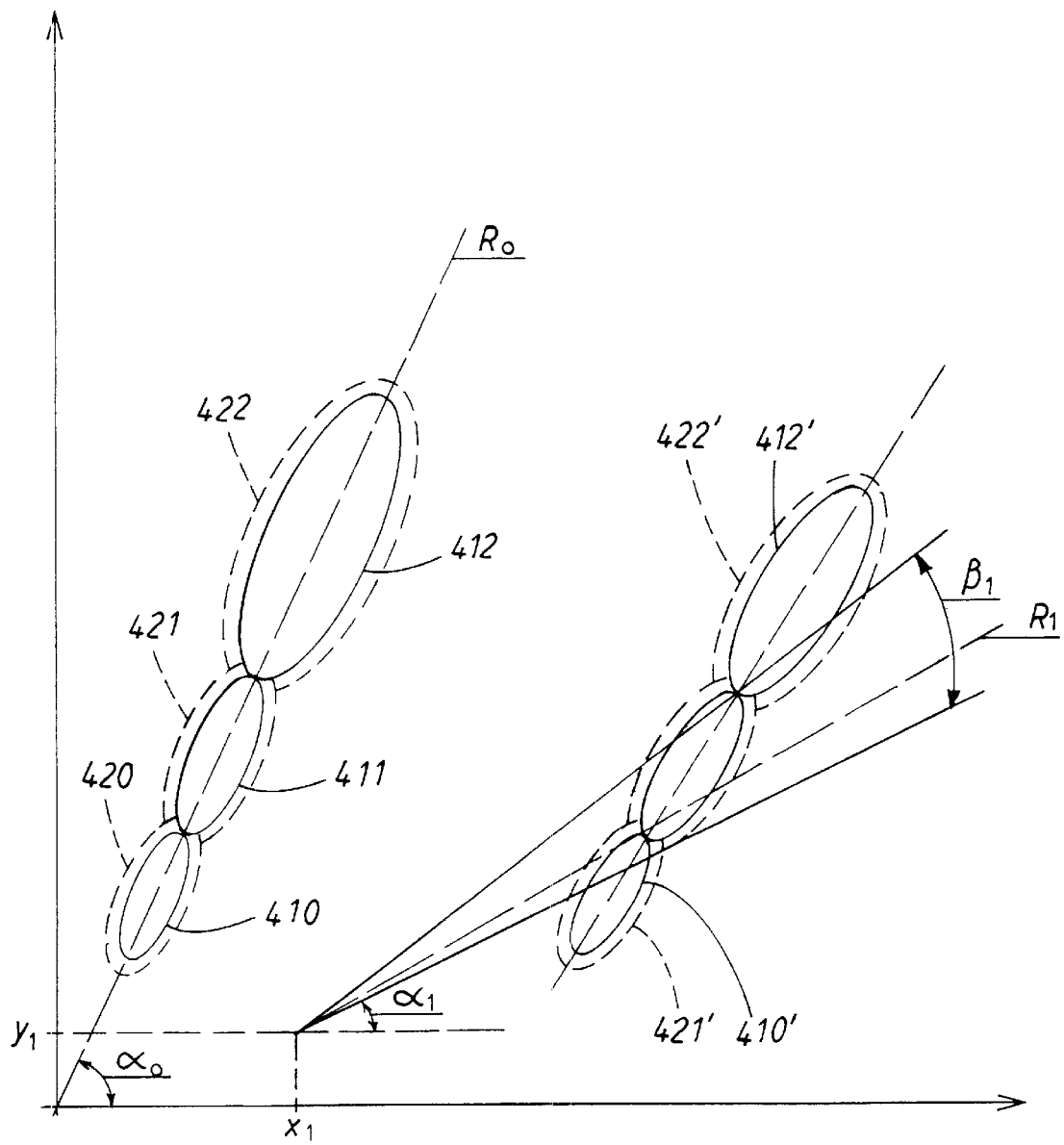
FIGS. 4 and 5 show how a measurement and calculation according to the invention are performed.

FIG. 4 shows how the invention can be applied to a measurement. Prior to the measurement there are, along an axis $R_0$ and an angle $\alpha_0$, resulting from the calculations in previous measurements, a number of previously calculated straight trajectory models 410, 411, 412, with associated center distances (measuring Positions) and maneuvering models 420, 421 422, which also have associated measuring positions. In the previous measurement the measuring sensor was located at the origin of the system of co-ordinates, as shown in FIG. 4, and in the measurement that is to be described here the measuring sensor has moved to another position having the co-ordinates $(x_1, y_1)$.

The measurement gives an angle $\alpha_1$, to the target along an axis $R_1$, which is shown by a dashed line in the drawing. The uncertainty in the measurement means that the angle $\alpha_1$ has a specific uncertainty, which is shown by a sector with solid lines around the axis $R_1$, where the sector has an aperture angle $\beta_1$, which indicates the measuring uncertainty.

According to the invention, a number of calculations are performed in connection with a measurement. These will be described below:

In connection with the measurement, straight trajectory models and manoeuvring models are predicted at the time of the measurement,
The measurement is performed, that is to say the angle between the target and the sensor is measured,
Predicted data for all the models in the form of their state vectors and co-variance matrices are updated by means of measured data, to obtain new trajectory models 410', 411', 412', and new manoeuvring models 420', 421', 422',
The probability is calculated for each straight trajectory model, based on the assumption that the target moves on a straight trajectory, and for each manoeuvring model on the assumption that the target manoeuvres,
The probability that the target will manoeuvre is calculated by comparing all manoeuvring models with their straight trajectory models,
If the probability that the target will manoeuvre fulfils a certain predetermined condition, data are taken to a predetermined extent from the respective manoeuvring model when calculating the range of the target in the straight trajectory models that have associated manoeuvring models, The range of the target from the sensor is calculated as a weighted average of a number of ranges according to the straight trajectory models, the weighting being based upon the respective probability of each straight trajectory model.

The fact that data are taken to a predetermined extent from the respective maneuvering model when calculating the range of the target in the straight trajectory models that have associated maneuvering models means that data from the respective maneuvering model are allowed to interact with the respective straight trajectory model, for example in a way known from the so-called IMM method.

The calculation of the position of the target in relation to the sensor may be expressed as:

$$[X,Y] = \Sigma \mu_i^* (x_i, y_i),$$

where

[X,Y] is the calculated position of the target in relation to the sensor, $\mu_i$ is the probability of straight trajectory model number i, and $(x_i, y_i)$ is the position of straight trajectory model number i.

Figure 5:
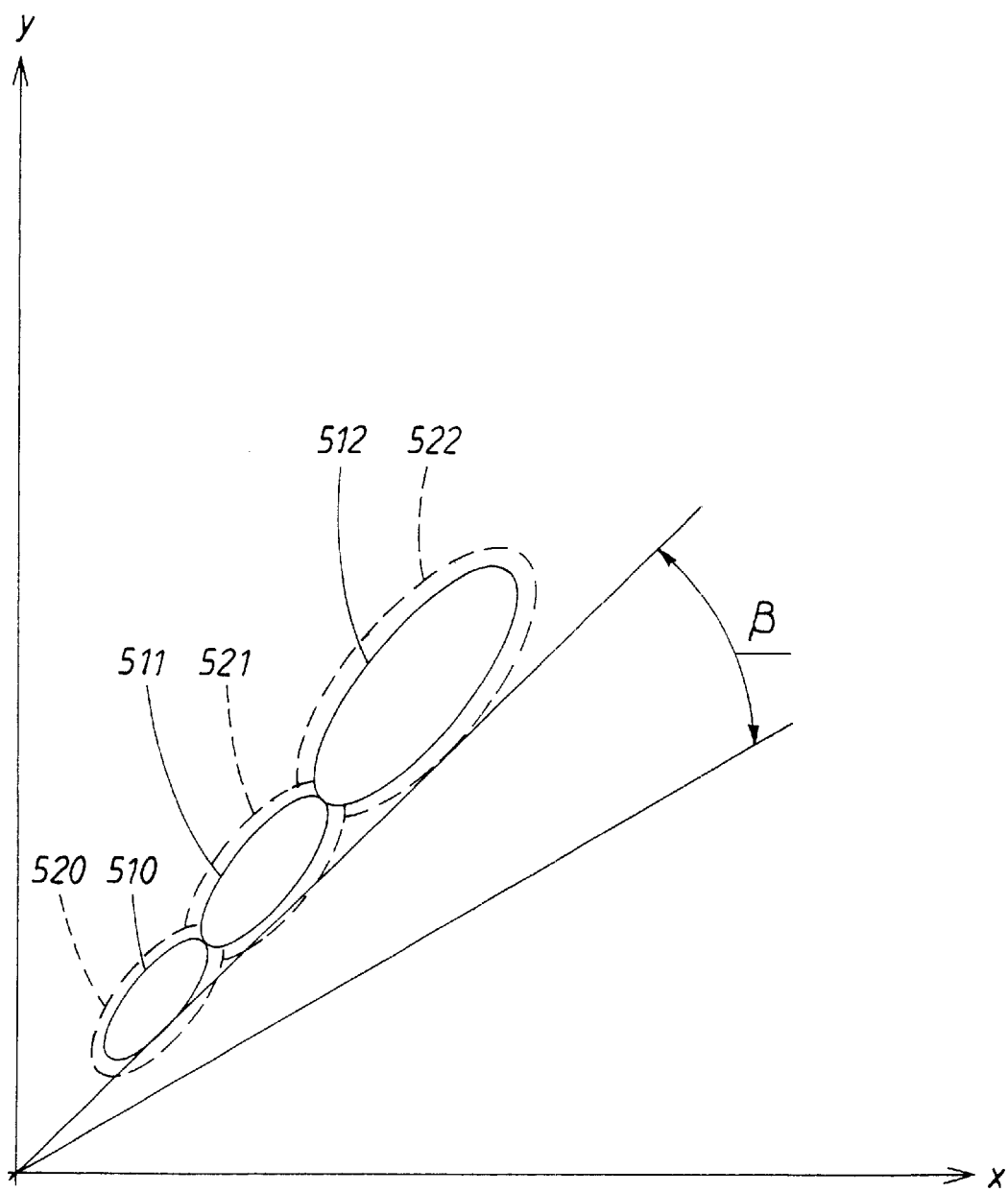

The condition stated above for allowing data from the manoeuvring models to influence their respective straight trajectory models may be formed in a large number of ways. FIG. 5 shows an example of one possible such condition:

A measuring sensor is situated at the origin of a system of co-ordinates, and performs a measurement towards a target, the angle between the target and the sensor being found to be the angle β, with a specific area of uncertainty, shown by a cone around the angle β. The straight trajectory models 510, 511, 512 and maneuvering models 520, 521, 522, which have been predicted for the target after prior measurement, are shown in the same way as in earlier figures, with solid and dashed lines respectively. In the measurement in the example in FIG. 5, the angle that is measured to the target, including the area of uncertainty of the angle, proves to lie outside all the straight trajectory models that have been predicted after prior measurement. On the other hand, the angle of the target lies within one or, as in the example, more of the maneuvering models that have been predicted after prior measurement.

The situation arising in the example in FIG. 5 may be used as a possible condition for allowing data from the manoeuvring models to influence their respective straight trajectory models. All models indicate that the target is manoeuvring, in that none of the straight trajectory models is applicable to the angle that has been measured to the target, whereas one or more of the manoeuvring models is applicable.

The influence that the manoeuvring models are allowed to have on the straight trajectory models when the condition is fulfilled can be expressed mathematically as follows:

$$X_n^1 \text{(straight trajectory)} =$$
$$a * \mu_n(\text{manoeuvring model}) * X_n(\text{manoeuvring model}) +$$
$$b * \mu_n(\text{straight trajectory model}) * X_n(\text{straight trajectory model})$$

where:

$X_n^1$ (straight trajectory) is the state vector for straight trajectory model number n after influencing by the manoeuvring model for the straight trajectory model, a and b are predetermined constants, $\mu_n$ (manoeuvring model) is the probability for manoeuvring model number n $X_n$ (manoeuvring model) is the state vector for manoeuvring model number n, and $\mu_n$ (trajectory model) is the probability for straight trajectory model number n, and $X_n'$ (trajectory model) is the state vector for straight trajectory model number n before influencing by the manoeuvring model for the straight trajectory model.

$P_n'$ (straight trajectory) and $\mu_n'$ (straight trajectory) are calculated by a method suitable for these quantities.

The constants a and b are, as stated, predetermined and may be calculated on the basis of a number of different considerations, for example how rapidly it is intended that the manoeuvring models should be capable of influencing the straight trajectory models.

When the manoeuvring models have in this way been allowed to influence the data from the straight trajectory models, the total state vector of the target is calculated in the way that has been described above, that is to say:

$$X = \Sigma \mu_i^* X_i,$$

the calculated range of the target from the sensor being obtained by Pythagoras' theorem from the position co-ordinates in X, $\mu_i$ being the probability for the straight trajectory model number i, and $X_i$ being the state vector for straight trajectory model number i The invention is not confined to the exemplary embodiment described above but readily lends itself to variations without departing from the scope of the following claims.

REFERENCES

1. T. Kronhamn, Bearings-only target motion analysis based on a multihypothesis Kalman filter and adaptive ownship motion control, IEE Proc.-Radar, Sonar Navigation, Vol. 145, No. 4, August 1998
2. Blom, H. A. P., and Y. Bar-Shalom, The Interacting Multiple Model Algorithm for Systems with Markovian Switching Coefficients, IEEE Trans. Automatic Control, Vol. 33, No. 8, pp 780–783, August 1988.

What is claimed is:

1. A method for calculating the range to a moving object/target by way of a sensor capable of measurements which determine the angle to the object, in which the sensor and the object have a movement relative to one another, the method comprising:

on the assumption that the target maintains a constant velocity, a number of possible target ranges are calculated, as well as areas of uncertainty associated with these ranges, said areas being denoted as straight trajectory models, on the assumption that the target accelerates, a number of possible target ranges are calculated, as well as areas of uncertainty associated with these ranges, said areas of uncertainty associated with these target ranges being denoted as maneuvering models, a number of the straight trajectory models having a maneuvering model assigned to them, in calculating the target range in the straight trajectory models that have associated maneuvering models, data from the respective maneuvering model is incorporated into said calculating when the probability that the target maneuvers exceeds a predetermined limit, the range of the target from the sensor is deemed to be a weighted average of a number of ranges of the straight trajectory models, the weighting being based on the probability of each straight trajectory model, whereby the range to the moving object is calculated.

2. Method according to claim 1, wherein the probability of the target maneuvering is deemed to have exceeded the said limit if, for a certain number of straight trajectory models, the probability of their maneuvering models exceeds a certain limit.

3. Method according to claim 1, wherein the straight trajectory models initially consist of ellipses, each ellipse having an extent such that the ratio between the major axis of an ellipse and the distance from the sensor to the origin of the ellipse is constant for all ellipses.

4. Method according to claim 1, wherein said limit selected for the probability of the target maneuvering is between zero and one, depending on various priorities attached to straight trajectory behavior or maneuvers of the target for the application in question.

* * * * *